United States Patent
Hori

(10) Patent No.: US 8,998,294 B2
(45) Date of Patent: Apr. 7, 2015

(54) DEFLECTOR APPARATUS

(71) Applicant: Aisin Seiki Kabushiki Kaisha, Kariya-shi, Aichi-ken (JP)

(72) Inventor: Kenji Hori, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/034,120

(22) Filed: Sep. 23, 2013

(65) Prior Publication Data

US 2014/0084626 A1    Mar. 27, 2014

(30) Foreign Application Priority Data

Sep. 24, 2012   (JP) ................................ 2012-209141

(51) Int. Cl.
*B60S 1/58*         (2006.01)
*B62D 35/00*      (2006.01)

(52) U.S. Cl.
CPC ........ *B62D 35/007* (2013.01); *B60S 1/58* (2013.01)

(58) Field of Classification Search
USPC ......... 296/91, 96, 180.1, 180.2, 180.3, 180.4, 296/180.5, 181.5; 701/49
See application file for complete search history.

(56) References Cited

U.S. PATENT DOCUMENTS

| | | | |
|---|---|---|---|
| 4,174,863 A * | 11/1979 | Gotz ......................... | 296/180.5 |
| 4,603,898 A * | 8/1986 | Udagawa et al. ............... | 296/91 |
| 4,810,022 A * | 3/1989 | Takagi et al. ............... | 296/180.5 |
| 6,273,488 B1 * | 8/2001 | Pike et al. ..................... | 296/91 |
| 6,447,050 B1 * | 9/2002 | Plassmeyer et al. ....... | 296/180.5 |
| 6,523,889 B2 * | 2/2003 | Birndorfer et al. .......... | 296/217 |
| 2001/0017479 A1 | 8/2001 | Birndorfer et al. | |
| 2011/0241377 A1 * | 10/2011 | Rogers et al. .............. | 296/180.3 |

FOREIGN PATENT DOCUMENTS

| | | | |
|---|---|---|---|
| DE | 3900405 A1 * | 7/1989 | ............. B62D 35/00 |
| DE | 10 2011 011 102 | 1/2012 | |
| EP | 0 110 232 | 6/1994 | |
| JP | 10-24869 | 1/1998 | |
| JP | 2005-350005 | 12/2005 | |

OTHER PUBLICATIONS

Extended European Search Report for EP 13185745.0 dated Dec. 15, 2014.

* cited by examiner

*Primary Examiner* — Jason S Morrow
*Assistant Examiner* — E Turner Hicks
(74) *Attorney, Agent, or Firm* — Finnegan, Henderson, Farabow, Garrett & Dunner, LLP

(57) ABSTRACT

A deflector apparatus for regulating air flows at a rear of a vehicle includes a movable portion arranged at a rear of a roof panel and an upper of a rear window of a vehicle and extended in a vehicle width direction. The movable portion is movable to increase and decrease a protrusion amount of a front end portion of the movable portion in a vehicle front-rear direction from an upper surface of the roof panel to upward. The deflector apparatus further includes a driving system for driving the movable portion to decrease (increase) the protrusion amount as a vehicle speed increases (decreases) to decrease (increase) an amount of air introduced by the movable portion and flowing along the rear window.

13 Claims, 7 Drawing Sheets

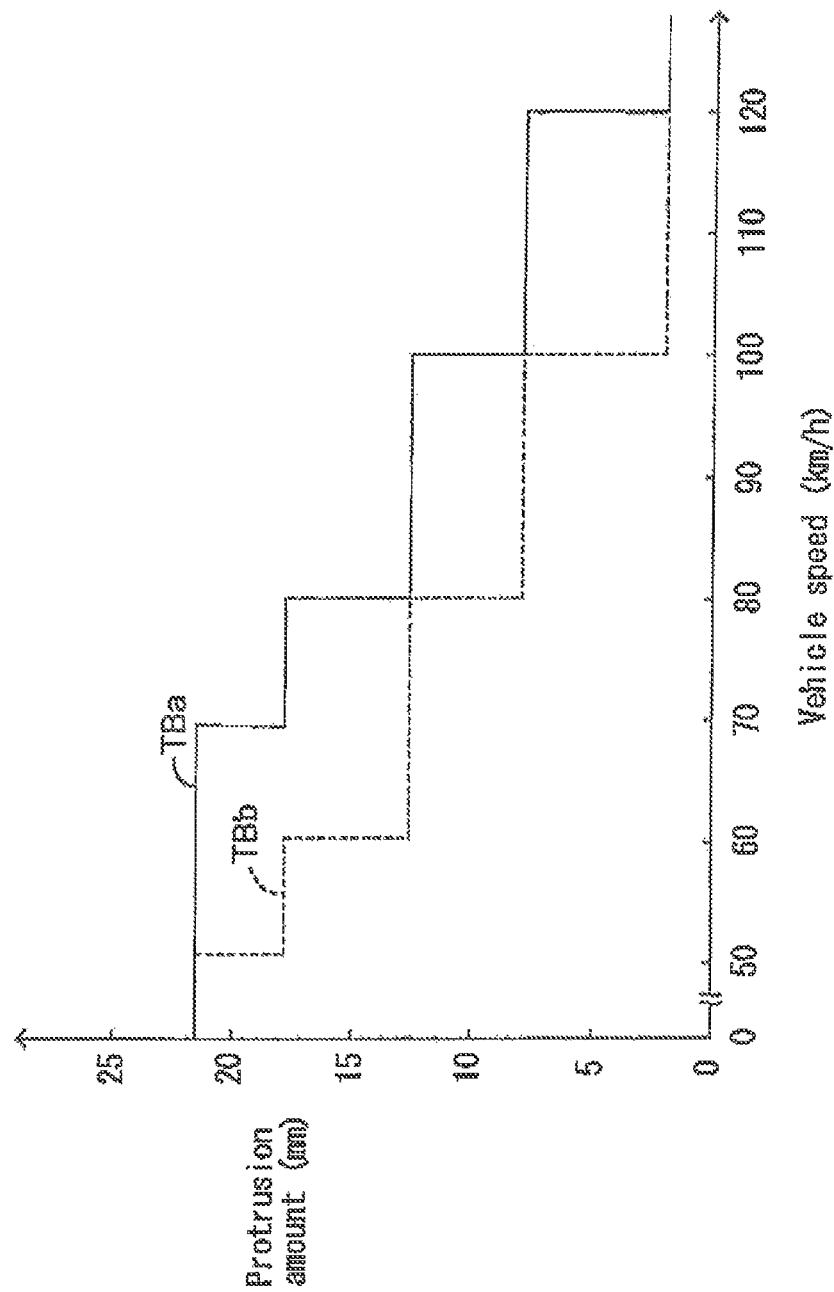

DEFLECTOR APPARATUS

CROSS REFERENCE TO RELATED APPLICATIONS

This application is based on and claims priority under 35 U.S.C. §119 to Japanese Patent Application 2012-209141, filed on Sep. 24, 2012, the entire content of which is incorporated herein by reference.

TECHNICAL FIELD

This disclosure generally relates to a deflector apparatus.

BACKGROUND DISCUSSION

A known deflector (roof spoiler) arranged at a roar of a roof panel and an upper of a rear window of a vehicle and extended in a vehicle width direction is disclosed in JPH10-24869A (hereinafter referred to as Patent reference 1). According to Patent reference 1, a position, or attitude (an angle) of the deflector is changed in accordance with weather. When it rains, the position, or attitude of the deflector is controlled so that an upper surface of the deflector is positioned horizontally, and substantially planar with an upper surface of the roof panel. In a state where the upper surface of the deflector is positioned horizontally, and substantially planar with the upper surface of the roof panel, a clearance is formed between the deflector and the upper of the rear window and a part of air flowing from front to rear of the vehicle along the upper surface of the roof panel flows along the rear window via the clearance. Accordingly, the adhesion of the dirt, for example, rain, mud and dust to the rear window may be reduced. On the other hand, according to Patent reference 1, when it is fine weather, a front end portion of the deflector is substantially planar with the upper surface of the roof panel and the position, or attitude of the deflector is controlled so that a rear end portion of the upper surface of the deflector is positioned lower than the front end portion of the upper surface of the deflector. In a state where the rear end portion of the upper surface of the deflector is positioned lower than the front end portion of the upper surface of the deflector, the clearance is closed and air flowing from the front to the rear of the vehicle along the upper surface of the roof panel is introduced to the rear of the vehicle without flowing toward the rear window. According to Patent reference 1, as the rear end portion of the upper surface of the deflector is positioned lower than the front end portion of the upper surface of the deflector, air passing over the roof panel flows obliquely downward along the upper surface of the deflector. Thus, a negative pressure area at the rear of the vehicle is narrowed, resulting in that air resistance is reduced. Accordingly, fuel efficiency is improved.

According to Patent reference 1, the deflector is configured not to be protruded higher than the upper surface of the roof panel in order to reduce air resistance in rainy weather and fine weather as much as possible. Thus, when air flows from the front to the rear of the vehicle along the upper surface of the roof panel in rainy weather, an amount of air flowing along the rear window via the clearance is small. Particularly when the vehicle runs at a low speed, the amount of air flowing along the rear window is very small. Accordingly, the adhesion of the dirt to the rear window may be reduced sufficiently.

A need thus exists for a deflector apparatus which is not susceptible to the drawback mentioned above.

SUMMARY

According to an aspect of the disclosure, a deflector apparatus for regulating air flows at a rear of vehicle includes a movable portion arranged at a roar of a roof panel and an upper of a rear window of a vehicle and extended in a vehicle width direction. The movable portion is movable to increase and decrease a protrusion amount of a front and portion of the movable portion in a vehicle front-rear direction from an upper surface of the roof panel to upward. The deflector apparatus further includes a driving system for driving the movable portion to decrease the protrusion amount as a vehicle speed increases to decrease an amount of air introduced by the movable portion and flowing along the rear window. The driving system drives the movable portion to increase the protrusion amount as the vehicle speed decreases to increase the amount of air introduced by the movable portion and flowing along the rear window.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a conceptual diagram of another table illustrating the relation of the vehicle speed and the protrusion amount of the movable portion according to the embodiment.

DETAILED DESCRIPTION

Figure 1:
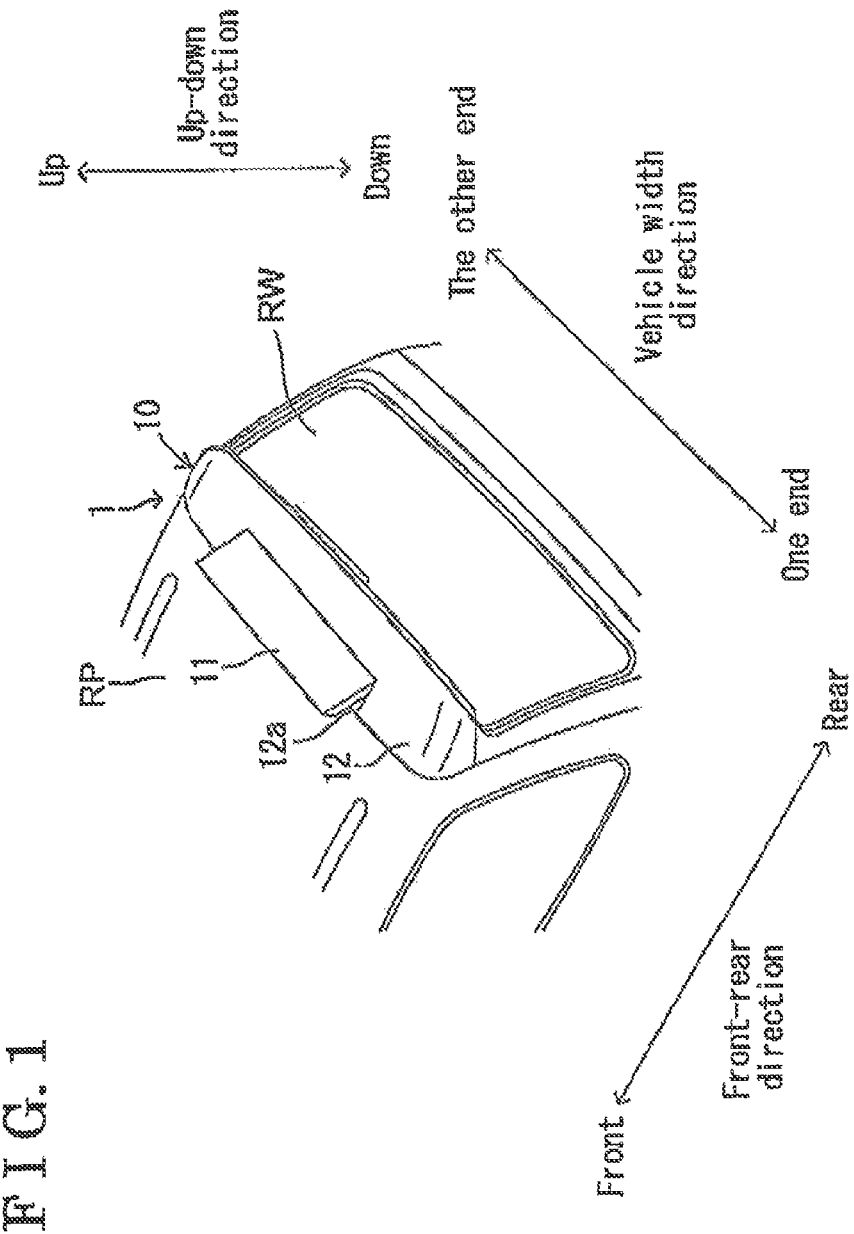
FIG. 1 is a perspective view, seeing from an obliquely upward, of a rear portion of a vehicle including a deflector apparatus according to an embodiment disclosed here.
Figure 2:
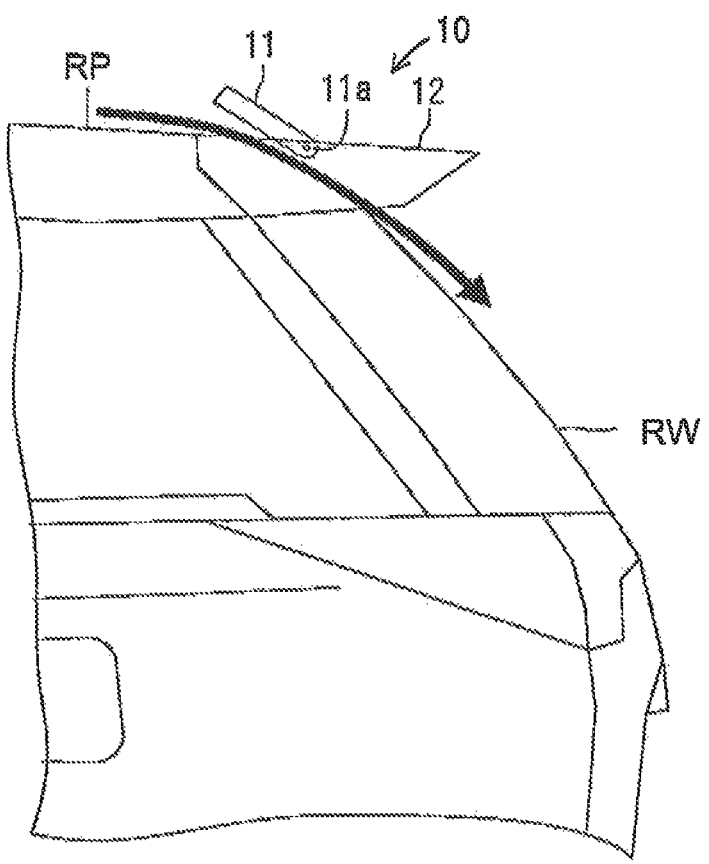
FIG. 2 is a side view of the rear portion of the vehicle in FIG. 1 according to the embodiment.

An embodiment of the disclosure will be described as follows. As illustrated in FIGS. 1 and 2, a deflector apparatus 1 of the embodiment includes a deflector body portion 10 regulating air flows at a rear of a vehicle. The deflector body portion 10 is arranged at a rear of a roof panel RP and an upper of a rear window RW of the vehicle and extends in a vehicle width direction.

The deflector body portion 10 includes a movable portion 11 and a fixed portion 12 both formed in a board shape and extending in the vehicle width direction. The movable portion 11 is arranged at a center in the vehicle width direction while the fixed portion 12 is formed to surround opposing ends of the movable portion 11 in the vehicle width direction and a rear portion of the movable portion 11. A front end portion of the fixed portion 12 is fixed on the rear end portion of the roof panel RP. An upper surface of the front end portion of the fixed portion 12 is arranged in a planar manner with the upper surface of the rear end portion of the roof panel RP. That is, the fixed portion 12 is flushed with the roof panel RP. The upper surface of the fixed portion 12 is inclined so that the rear end portion of the fixed portion 12 is positioned lower than the front end portion of the fixed portion 12. The fixed portion 12 is formed to extend from one end to the other end and the opposing end portions in the vehicle width direction are bent downward. The center of the front end portion of the fixed portion 12 in the vehicle width direction includes a cutout portion 12a having a substantially rectangular shape in a plan view. The cutout portion 12a is extended in the vehicle width direction and the length of the putout portion 12a in the vehicle width direction is approximately a half of the vehicle width. The movable portion 11 has the same shape as a shape of the cutout portion 12a. The rear end portion of the movable portion 11 is assembled by supporting portions each arranged at opposing end portions of the cutout portion 12a in the vehicle width direction via a shaft member 11a (serving as a shaft). The movable portion 11 is pivotable about the shaft member 11a. When the movable portion 11 pivots about the shaft member 11a, a protrusion amount of the front end portion of the movable portion 11 (hereinafter, a protrusion amount of the movable portion 11) from the upper surface of the roof panel RP to upward is changed. Accordingly, the cutout portion 12a is open and closed. In a state where the cutout portion 12a is closed, the upper surface of the movable portion 11 and the upper surface of the roof panel RP are arranged in the planar manner while the front end surface of the movable portion 11 and the rear end surface of the roof panel RP are in contact with one another. On the other hand, in a state where the cutout portion 12a is open, the front end portion of the movable portion 11 protrudes higher than the upper surface of the roof panel RP. Driven by a driving system 20, the upper surface and a lower surface of the movable portion 11 are inclined so that the rear end portion (close to the shaft member 11a) of the movable portion 11 is always positioned lower than the front end portion (opposite to the shaft member 11a) of the movable portion 11.

Figure 3:
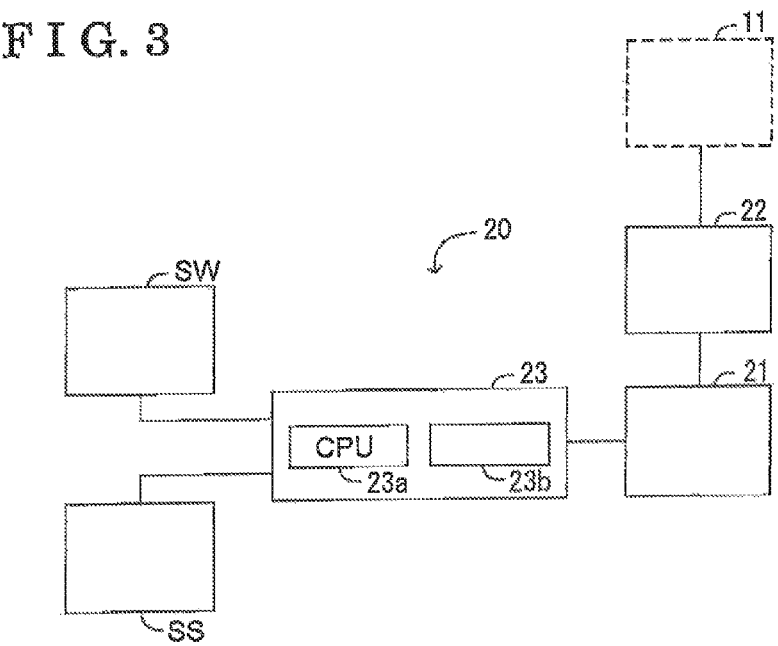
FIG. 3 is a block diagram of the deflector apparatus in FIG. 1 according to the embodiment.
Figure 4:
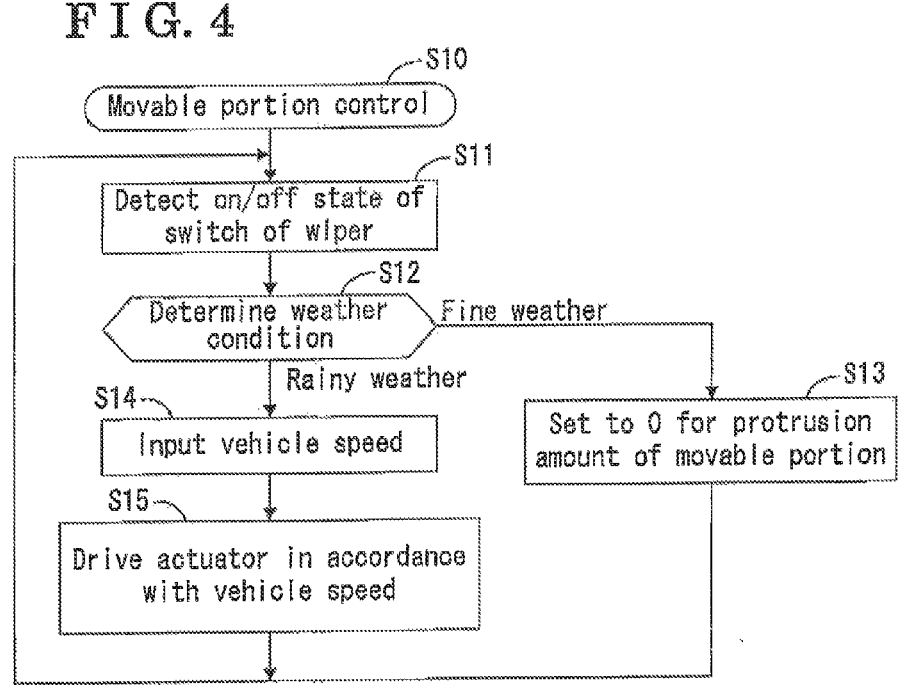
FIG. 4 is a flowchart illustrating a movable portion control program according to the embodiment.

The movable portion 11 is connected with the driving system 20. A pivot angle of the movable portion 11, that is, the protrusion amount of the movable portion 11 is controlled by the driving system 20. As illustrated in FIG. 3, the driving system 20 includes an actuator 21 configured with, for example, an electric motor or an air cylinder, and a link mechanism 22 connecting the movable portion 11 to the actuator 21. The link mechanism 22 includes, for example, at least one cam or latch mechanism and transmits en output of the actuator 21 to the movable portion 11. The actuator 21 is controlled by a control portion 23. The control portion 23 includes a CPU 23a (serving as a weather determination device) and a memory 23b. The memory 23b stores, for example, a movable portion control program for controlling the protrusion amount of the movable portion 11 (see FIG. 4) and a table TB illustrating a relation between the protrusion amount of the movable portion 11 (a driving amount of the actuator 21) and the vehicle speed (see FIG. 5). The control portion 23 is connected to a vehicle speed sensor SS detecting the vehicle speed. The control portion 23 is connected to a switch SW turning on/off a wiper. The control portion 23 detects the vehicle speed and an on/off state of the wiper and controls the protrusion amount of the movable portion 11 by driving the actuator 21 in accordance with detection results.

Next, an operation of the deflector apparatus 1 configured as above will be described. When power is supplied to the control portion 23, the CPU 23a reads the movable portion control program illustrated in FIG. 4 from the memory 23b, starts the movable portion control process at Step S10 and performs a process from Step S11 to Step S15 repeatedly. First, the CPU 23a detects the on/off state of the switch SW of the wiper at Step S11. Next, the CPU 23a determines the weather condition using the detected on/off state of the switch SW of the wiper at Step S12. When the switch SW is in an off state, the CPU 23a determines that the weather is fine at Step S12 and sets to 0 for the protrusion amount of the movable portion 11 at Step 13. That is, the CPU 23a drives the actuator 21 so that the protrusion amount of the movable portion 11 is assumed to be 0. Accordingly, the cutout portion 12a is closed. In a state where the cutout portion 12a is closed, air flowing from front to rear of the vehicle along the upper surface of the roof panel RP flows along the upper surface of the movable portion 11 and the fixed portion 12. As the movable portion 11 and the fixed portion 12 are inclined so that the respective rear end portions of the movable portion 11 and the fixed portion 12 are positioned lower than the respective front end portions of the movable portion 11 and the fixed portion 12, air passing over the roof panel RP flows obliquely downward along the upper surface of the movable portion 11 and the fixed portion 12. Accordingly, as the negative pressure area at the rear of the vehicle is narrowed, air resistance is reduced. After performing Step S13, the CPU 23a proceeds to the Step S11.

Figure 5:
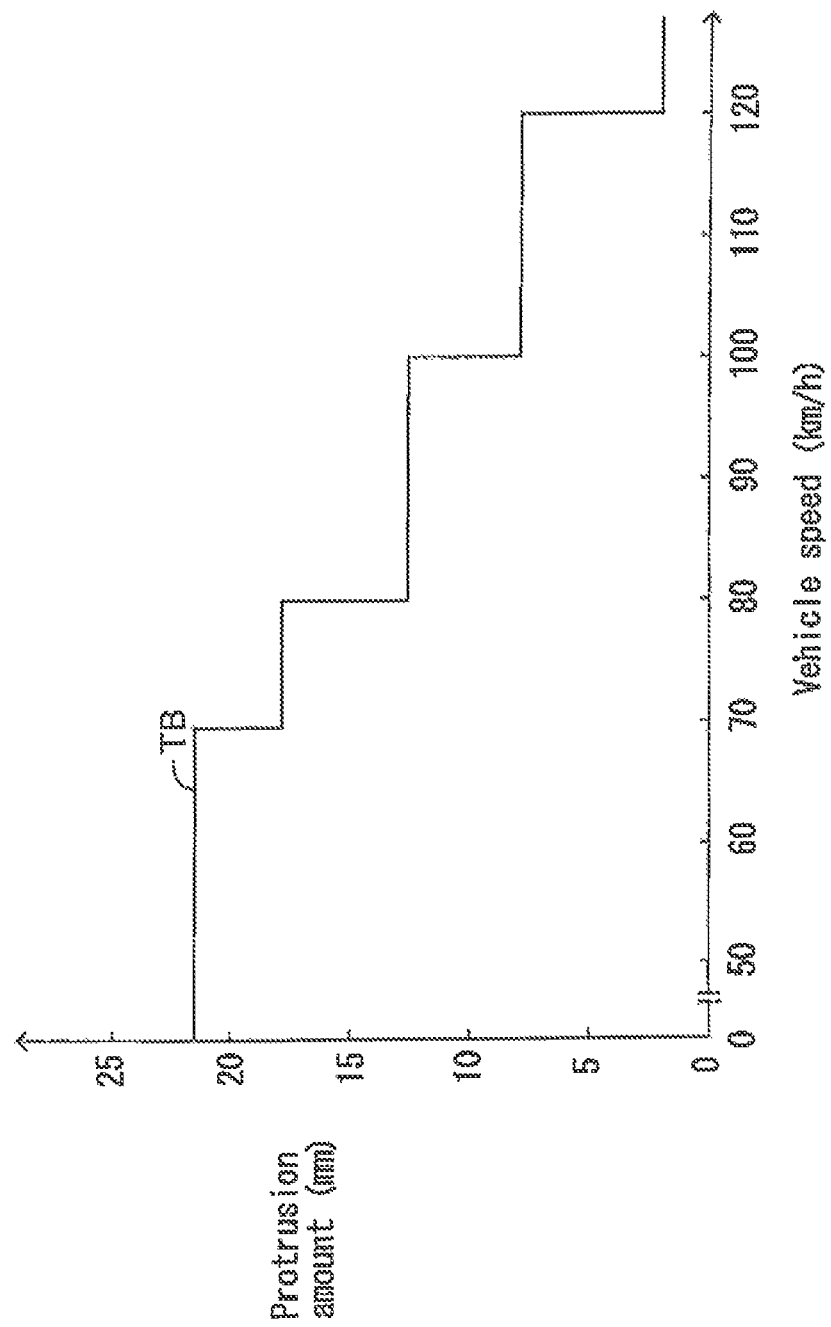
FIG. 5 is a conceptual diagram of a table illustrating a relation of a vehicle speed and a protrusion amount of a movable portion according to the embodiment.

When the switch SW is in an on state, the CPU 23a determines that the weather is rainy at Step S12 and inputs the vehicle speed indicated by the vehicle speed sensor SS at Step S14. The CPU 23a drives the actuator 21 in accordance with the inputted vehicle speed at Step S15. Specifically, the CPU 23a refers to the table TB (FIG. 5) illustrating the relation between the protrusion amount of the movable portion 11 (the driving amount of the actuator 21) and the vehicle speed and determines the protrusion amount of the movable portion 11 (the driving amount of the actuator 21). The protrusion amount of the movable portion 11 accords with the inputted vehicle speed. According to the embodiment, as the vehicle speed increases (decreases), the table TB is set to decrease (increase) the protrusion amount of the movable portion 11 in a stepwise manner (for example, 5 steps). In particular, for example, when the vehicle speed is less than 70 kilometer per hour, the protrusion amount is set to 22 millimeter. When the vehicle speed is equal to or greater than 70 kilometer and less than 80 kilometer, the protrusion amount is set to 18 millimeter. When the vehicle speed is equal to or greater than 80 kilometer and less than 90 kilometer, the protrusion amount is set to 13 millimeter. When the vehicle speed is equal to or greater than 100 kilometer and less than 120 kilometer, the protrusion amount is set to 7 millimeter. When the vehicle speed is equal to or greater than 120 kilometer, the protrusion amount is set to 2 millimeter. As set values of the table TB in FIG. 5 are examples, the set values are settable in accordance with vehicle types. The CPU 23a drives the actuator 21 so that the protrusion amount of the movable portion 11 (the driving amount of the actuator 21) is the determined protrusion amount (driving amount) of the movable portion 11. In a state where the protrusion amount of the movable portion 11 (the driving amount of the actuator 21) is the determined protrusion amount (driving amount) of the movable portion 11, the front end portion of the movable portion 11 protrudes higher than the upper surface of the roof panel RP. That is, the cutout portion 12a is open. As an arrow in FIG. 2 indicates, the part of air flowing from the front to the rear of the vehicle along the roof panel RP flows toward the rear window RW via the cutout portion 12a. Accordingly, the adhesion of the dirt to the rear window RW may be reduced. After performing Step S15, the CPU 23a proceeds to Step S11 and performs a process from Step S11 to Step S15 repeatedly.

The deflector apparatus 1 is configured to change the protrusion amount of the movable portion 11 in accordance with the increase (decrease) of the vehicle speed. When the vehicle runs at a low speed, an influence on fuel efficiency caused by the increase of the protrusion amount of the movable portion 11 is small because air resistance is not much increased. Then, when the vehicle runs at a low speed, the table TB is set to increase the protrusion amount of the movable portion 11 to increase the amount of air flowing toward the rear window RW. Thus, even when the vehicle speed is low, the adhesion of the dirt to the rear window RW may be reduced sufficiently. On the other hand, when the vehicle runs at a high speed, fuel efficiency is deteriorated by the increase of the protrusion amount of the movable portion 11 because air resistance is increased. Then, when the vehicle runs at a high speed, the table TB is set to decrease the protrusion amount of the movable portion 11. That is, the amount of air flowing toward the rear window RW is small when the vehicle speed is high. However, the adhesion of the dirt to the rear window RW may be reduced sufficiently because a flow speed of air flowing toward the rear window RW is high. The deflector apparatus 1 sufficiently prevents the dirt from adhering to the rear window RW while suppressing the deterioration of fuel efficiency due to the increase of air resistance regardless of the magnitude of the vehicle speed.

In a state where the cutout portion 12a is open, the lower surface of the movable portion 11 is inclined so that the rear end portion of the movable portion 11 is positioned lower than the front end portion of the movable portion 11. Accordingly, the part of air flowing from the front to the rear of the vehicle along the upper surface of the roof panel RP flows obliquely downward along the lower surface of the movable portion 11. Thus, air introduced by the movable portion 11 flows along the rear window RW. Then, the adhesion of the dirt to the rear window RW may be sufficiently reduced.

The movable portion 11 is arranged at the center portion of the fixed portion 12 in the vehicle width direction. Accordingly, the adhesion of the dirt to the rear window RW in the vehicle width direction may be reduced, particularly at the center portion of the rear window RW in the vehicle width direction. When the adhesion of the dirt to the center portion of the rear window RW in the vehicle width direction is reduced, a rear view of the vehicle running in rainy weather may be sufficiently maintained. Because the length of the movable portion 11 in the vehicle width direction is short (approximately a half of the vehicle width), air resistance due to the protrusion of the movable portion 11 higher than the upper surface of the roof panel RP is increased only by a small amount. Further, as the fixed portion 12 inclines so that the rear end portion of the fixed portion 12 is positioned lower than the front end portion of the fixed portion 12, the part of air passing over the roof panel RP flows obliquely downward along the upper surface of the fixed portion 12. Thus, as the negative pressure area at the rear of the vehicle is narrowed, air resistance is reduced. Accordingly, the deterioration of fuel efficiency may be minimized. Further, a space below the fixed portion 12 may be maintained for arranging the driving system 20.

In a case where the movable portion 11 is configured to change the protrusion amount continuously in accordance with the increase (decrease) of the vehicle speed, structures of, for example, an actuator and a link mechanism need to be complex in order to control the protrusion amount of the movable portion 11 precisely. In contrast, according to the embodiment, as the movable portion 11 is configured to change the protrusion amount in a stepwise manner (for example, 5 steps) in accordance with the increase (decrease) of the vehicle speed, the actuator 21 and the link mechanism 22 may have comparatively simple configurations and may achieve a precise control of the protrusion amount of the movable portion 11 at a sufficient level. In a case where the movable portion 11 is configured to change the protrusion amount continuously in accordance with the increase (decrease) of the vehicle speed, the actuator 21 is driven due to even a slight change of the vehicle speed. In a case where the actuator 21 is driven due to a slight change of the vehicle speed, energy (power) consumption is increased. According to the embodiment, the protrusion amount of the movable portion 11 is changed in a stepwise manner (for example, 5 steps). That is, the actuator 21 is driven only when the vehicle speed exceeds a predetermined threshold value. Thus, power consumption may be reduced.

Because less amount of the dirt is adhered to the rear window RW in fine weather than in rainy weather, the movable portion 11 does not need to protrude higher than the upper surface of the roof panel RP to flow air toward the rear window RW. According to the embodiment, when the switch SW is in the off state, the CPU 23a determines that the weather is fine (Step S12 in FIG. 4) and drives the actuator 21 so that the protrusion amount of the movable portion 11 is assumed to be 0 (Step S13 in FIG. 4). Thus, when it is fine weather, that is, when the switch SW of the wiper is in the off state, the upper surface of the movable portion 11 and the upper surface of the rear end portion of the roof panel RP are positioned in the planar manner regardless of vehicle speed. That is, the movable portion 11 is flushed with the roof panel RP. Thus, air resistance may be prevented from being unnecessarily increased in fine weather.

In a case where the upper surface of the movable portion 11 and the upper surface of the roof panel RP are positioned in the planar manner while the front end portion of the movable portion 11 and the rear end portion of the roof panel RP are separated in a vehicle front-rear direction, air resistance is increased because a vortex is generated at an upper of a clearance, or above the clearance formed between the movable portion 11 and the roof panel RP. In contrast, according to the embodiment, in a state where the upper surface of the movable portion 11 and the upper surface of the roof panel RP are positioned in the planar manner, the front end portion of the movable portion 11 and the rear end portion of the roof panel RP are in contact with one another and no clearance is formed between the movable portion 11 and the roof panel RP. Accordingly, air flowing from the front to the rear of the vehicle along the upper surface of the roof panel RP flows smoothly toward a rear of the vehicle. Thus, air resistance may be prevented from being increased.

Constructions of the deflector apparatus 1 are not limited to the aforementioned embodiment and various modifications may be applied as long as the modifications do not depart from the objective of the disclosure.

Figure 6:
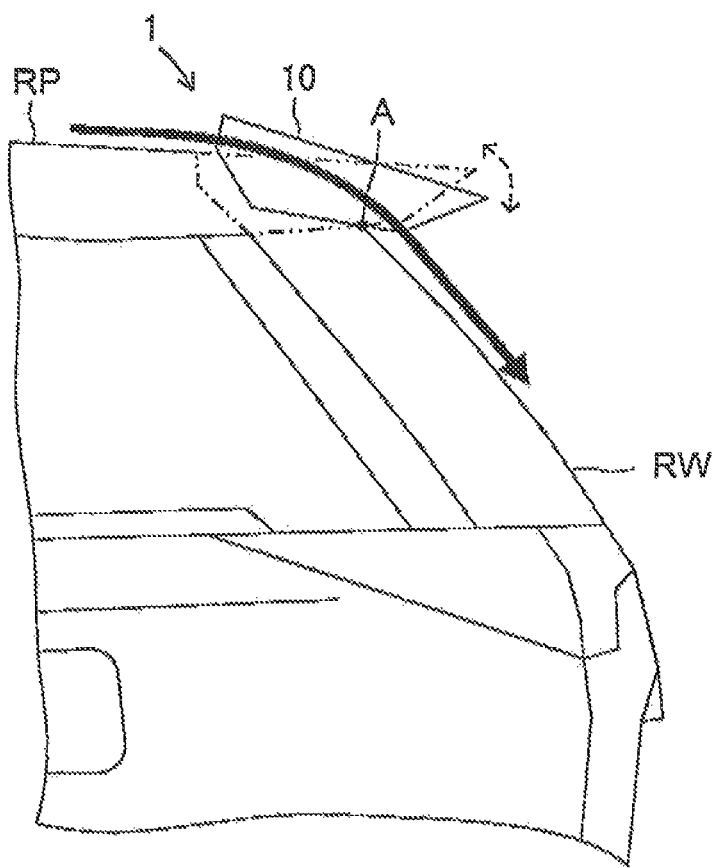
FIG. 6 is a side view of the rear portion of the vehicle including the deflector apparatus of a modified example of the embodiment.
Figure 7:
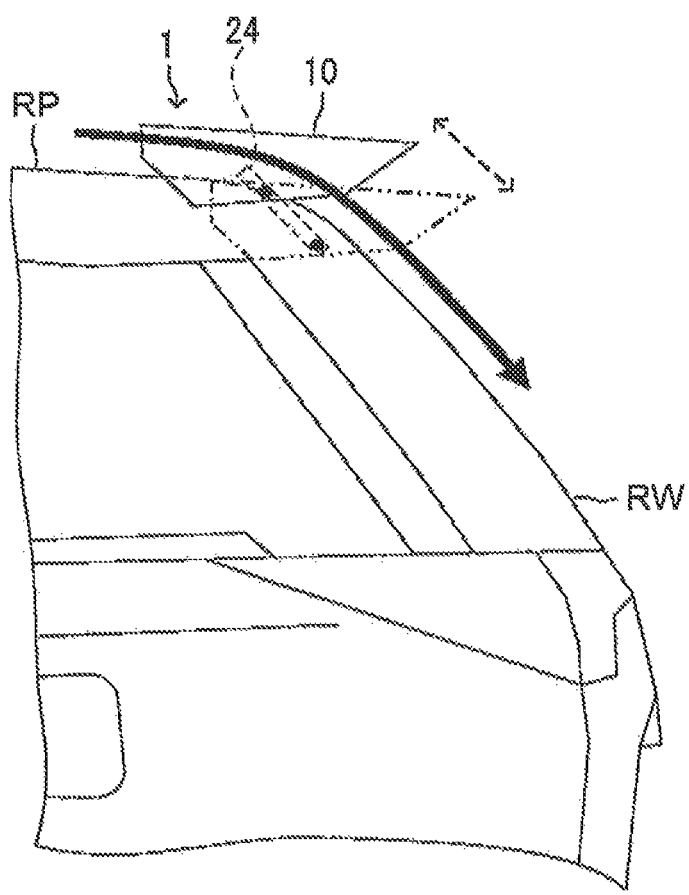
FIG. 7 is a side view of the rear portion of the vehicle including the deflector apparatus of another modified example of the embodiment.

According to the aforementioned embodiment, the fixed portion 12 includes the cutout portion 12a and the movable portion 11. The cutout portion 12a is arranged at the center of the fixed portion 12 in the vehicle width direction and the movable portion 11 is arranged to open and close the cutout portion 12a. Alternatively, as illustrated in FIG. 6, the deflector body portion 10 may be configured so that the rear end portion of the deflector body portion 10 is mounted to the rear portion of the vehicle via a shaft A to be pivotable about the shaft A. The pivot angle of the deflector body portion 10 is controlled by a driving system similar to the driving system 20. As illustrated in FIG. 7, the deflector body portion 10 may be configured to be mounted to the rear of the vehicle via a slide rail 24 and to be slidable obliquely forward and upward (backward and downward). The driving system similar to the driving system 20 may control the sliding amount of the deflector body portion 10. In a case where the deflector body portion 10 is mounted to the rear of the vehicle via the slide rail 24, the deflector body portion 10 may be configured so that the front end portion and the rear end portion of the deflector body portion 10 are positioned at the same height. In a case where the deflector body portion 10 is configured as illustrated in FIGS. 6 and 7, the deflector body portion 10 corresponds to the movable portion 11 of the embodiment. Thus, the adhesion of the dirt to the rear window RW in the vehicle width direction may be reduced in a wider area than that of the embodiment. However, air resistance in rainy weather may be slightly increased compared to the construction of the aforementioned embodiment.

According to the aforementioned embodiment, a single table TB is used to determine the protrusion amount of the movable portion 11 (the driving amount of the actuator 21) without distinguishing the acceleration and deceleration of the vehicle. Alternatively, as illustrated in FIG. 8, a table TBa illustrating the relation of the protrusion amount of the movable portion 11 and the vehicle speed when the vehicle accelerates and a table TBb illustrating the relation of the protrusion amount of the movable portion 11 and the vehicle speed when the vehicle decelerates may be separately set. The table TBa in FIG. 8 is the same as the table TB of the embodiment (FIG. 5) and the same protrusion amount of the movable portion 11 is set as that of the embodiment during acceleration of the vehicle. On the other hand, the protrusion amount of the movable portion 11 is set, for example, as follows during deceleration of the vehicle. When the vehicle speed is less than 50 kilometer per hour, the protrusion amount is set to 22 millimeter. When the vehicle speed is equal to or greater than 50 kilometer and less than 60 kilometer, the protrusion amount is set to 18 millimeter. When the vehicle speed is equal to or greater than 60 kilometer and less than 80 kilometer, the protrusion amount is set to 13 millimeter. When the vehicle speed is equal to or greater than 80 kilometer and less than 100 kilometer, the protrusion amount is set to 7 millimeter. When the vehicle speed is equal to or greater than 100 kilometer, the protrusion amount is set to 2 millimeter. As above, at the same vehicle speed, the movable portion 11 is set so that the movable portion 11 during deceleration protrudes smaller than the protrusion amount of the movable portion 11 during acceleration. As set values of the table TBa and the table TBb in FIG. 8 are examples, the set values are settable in accordance of with vehicle types. For example, at the same vehicle speed, the movable portion 11 is set so that the movable portion 11 during deceleration protrudes larger than the protrusion amount of the movable portion 11 during acceleration. In a case where, at the same vehicle speed, the movable portion 11 is set so that the movable portion 11 during deceleration protrudes larger than the protrusion amount of the movable portion 11 during acceleration, the CPU 23a stores the vehicle speed detected at Step S14 to the memory 23b temporarily and determines whether the vehicle is accelerated or decelerated by comparing the vehicle speed newly detected when the Step S14 is performed with the stored vehicle speed. According to the detection result, the CPU 23a selects either the table TBa or the table TBb and determines the protrusion amount of the movable portion 11 (the driving amount of the actuator 21) using the selected table. Further, the tables TB, TBa and TBb may be editable by users.

According to the aforementioned embodiment, the CPU 23a determines the weather condition by detecting the on/off state of the switch SW of the wiper. Alternatively, a sensor which outputs a signal to accord with the weather condition may be used to determine the weather condition. For example, a raindrop sensor may be connected to the control portion 23 for determining the weather condition.

Even in fine weather, the dirt adheres to the rear window RW in a case where the vehicle runs on dusty roads or dirt roads. Thus, the movable portion 11 may be configured to change the protrusion amount in accordance with the vehicle speed even in fine weather. Users may select one of operation modes, either a movable mode changing the protrusion amount of the movable portion 11 in accordance with the vehicle speed, or a fixed mode set a predetermined amount (for example, 0) of the protrusion amount of the movable portion 11 regardless of the vehicle speed. Specifically, for example, a switch for selecting the operation mode may be connected with the control portion 23 instead of the switch SW of the wiper. The CPU 23a detects the operation mode selected by the switch for selecting the operation mode instead of Steps S11 and S12 determining the weather condition. When the movable mode is selected. Steps S14 and Step S15 may be performed. On the other hand, when the fixed mode is selected. Step S13 may be performed.

According to the aforementioned embodiment, the deflector apparatus 1 for regulating air flows at the rear of the vehicle includes the movable portion 11 arranged at the rear of the roof panel RP and the upper of the rear window RW of the vehicle and extended in the vehicle width direction. The movable portion 11 is movable to increase and decrease the protrusion amount of the front end portion of the movable portion 11 in the vehicle front-rear direction from the upper surface of the roof panel RP to upward. The deflector apparatus 1 further includes the driving system 20 for driving the movable portion 11 to decrease the protrusion amount as the vehicle speed increases to decrease the amount of air introduced by the movable portion 11 and flowing along the rear window RW. The driving system 20 also drives the movable portion 11 to increase the protrusion amount as the vehicle speed decreases to increase the amount of air introduced by the movable portion 11 and flowing along the rear window RW.

According to the aforementioned structure, when the vehicle runs at a low speed, the protrusion amount of the movable portion 11 is increased resulting in that the amount of air flowing along the rear window RW is increased. Thus, even when the vehicle speed is low, the adhesion of the dirt to the rear window RW may be reduced sufficiently. When the vehicle runs at a low speed, the influence on fuel efficiency caused by the increase of the protrusion amount of the movable portion 11 is small because air resistance is not much increased. When the vehicle runs at a high speed, the amount of air flowing toward the rear window RW is small. However, the adhesion of the dirt to the rear window RW may be reduced sufficiently because a flow speed of air flowing toward the rear window RW is high. According to aforementioned embodiment, the deflector apparatus 1 sufficiently prevents the dirt from adhering to the rear window RW while suppressing the deterioration of fuel efficiency due to the increase of air resistance regardless of the magnitude of the vehicle speed.

According to the aforementioned embodiment, the rear end portion of the movable portion 11 in the vehicle front-rear direction is positioned lower than the front end portion of the movable portion 11 in the vehicle front-rear direction while the front end portion of the movable portion 11 in the vehicle front-rear direction protrudes higher than the upper surface of the roof panel RP.

According to the aforementioned structure, the part of air flowing from the front to the rear of the vehicle along the upper surface of the roof panel RP is introduced obliquely downward along the lower surface of the movable portion 11. Accordingly, air introduced by the movable portion 11 may easily flow along the rear window RW. Thus, the adhesion of the dirt to the rear window RW may be reduced further reliably.

According to the aforementioned embodiment, the deflector apparatus 1 further includes the fixed portion 12 arranged at the opposing ends of the movable portion 11 in the vehicle width direction and extended in the vehicle width direction. The fixed portion 12 is fixed at the rear end portion of the roof panel RP in the vehicle front-rear direction. The movable portion 11 is arranged at a center in the vehicle width direction.

According to the aforementioned structure, because the movable portion 11 is arranged at the center in the vehicle width direction, the adhesion of the dirt to the rear window RW in the vehicle width direction may be reduced, particularly at the center portion of the rear window RW in the vehicle width direction. When the adhesion of the dirt to the rear window RW in the vehicle width direction is reduced, a rear view of the vehicle in bad weather may be sufficiently maintained. Further, because the length of the movable portion 11 in the vehicle width direction is short (for example, approximately a half of the vehicle width), air resistance due to the protrusion of the movable portion 11 higher than the upper surface of the roof panel RP is increased only by a small amount. Accordingly, the deterioration of fuel efficiency may be minimized. Further, a space below the fixed portion 12 may be maintained for arranging the driving system 20 which drives the movable portion 11.

According to the aforementioned embodiment, the driving system 20 decreases the protrusion amount of the movable portion 11 in a stepwise manner as the vehicle speed increases and increases the protrusion amount of the movable portion 11 in a stepwise manner as the vehicle speed decreases.

In a case where the movable portion 11 is configured to change the protrusion amount continuously in accordance with the increase (decrease) of the vehicle speed, the structures of, for example, the actuator and the link mechanism need to be complex in order to control the protrusion amount of the movable portion precisely. In contrast, according to the embodiment, as the movable portion 11 is configured to change the protrusion amount in a stepwise manner in accordance with the increase (decrease) of the vehicle speed, the actuator 21 and the link mechanism 22 may have comparatively simple configurations and may achieve a precise control of the protrusion amount of the movable portion 11 at a sufficient level. In a case where the movable portion 11 is configured to change the protrusion amount continuously in accordance with the increase (decrease) of the vehicle speed, the movable portion 11 is driven due to even a slight change of the vehicle speed. In a case where the movable portion 11 is driven due to a slight change of the vehicle speed, energy (for example, power) consumption for driving the movable portion 11 is increased. In contrast, according to the embodiment, the protrusion amount of the movable portion 11 is changed in a stepwise manner. That is, the movable portion 11 is driven only when the vehicle speed exceeds the predetermined threshold value. Thus, energy consumption may be reduced.

According to the aforementioned embodiment, the driving system 20 includes the CPU 23a determining the weather condition and drives the movable portion 11 to position the upper surface of the movable portion 11 and the upper surface of the roof panel RP in a planar manner regardless of the magnitude of the vehicle speed when the CPU 23a determines that the weather is fine.

Because less amount of the dirt is adhered to the rear window RW in fine weather than in rainy weather, the movable portion 11 does not need to protrude higher than the upper surface of the roof panel RP to flow air toward the rear window RW. According to the embodiment, when it is fine weather, the upper surface of the movable portion 11 and the upper surface of the roof panel RP are positioned in a planar manner regardless of vehicle speed. That is, the movable portion 11 is flushed with the roof panel RP. Thus, air resistance may be prevented from being unnecessarily increased in fine weather.

According to the aforementioned embodiment, the front end portion of the movable portion 11 in the vehicle front-rear direction is in contact with the rear end portion of the roof panel RP in the vehicle front-rear direction while an upper surface of the movable portion 11 and the upper surface of the roof panel RP are positioned in a planar manner.

In a case where the upper surface of the movable portion 11 and the upper surface of the roof panel RP are positioned in a planar manner while the front end portion of the movable portion 11 in the vehicle front-rear direction and the rear end portion of the roof panel RP in the vehicle front-rear direction are separated in the vehicle front-rear direction, air resistance is increased because the vortex is generated at the upper of the clearance, or above the clearance formed between the movable portion 11 and the roof panel RP. In contrast, according to the embodiment, in a state where the upper surface of the movable portion 11 and the upper surface of the roof panel RP are positioned in the planar manner, the front end portion of the movable portion 11 in the vehicle front-rear direction and the rear end portion of the roof panel RP in the vehicle front-rear direction are in contact with one another and no clearance is formed between the movable portion 11 and the roof panel RP. Accordingly, air flowing from the front to the rear of the vehicle along the upper surface of the roof panel RP flows smoothly toward the rear of the vehicle. Thus, air resistance may be prevented from being increased.

According to the aforementioned embodiment, the deflector apparatus 1 further includes the shaft member 11a and the shaft A mounted to the rear end portion of the movable portion 11 at the rear of the vehicle. The movable portion 11 is configured to pivot about the shaft member 11a and the shaft A.

According to the aforementioned embodiment, the driving system 20 controls the pivot angle of the movable portion 11.

According to the aforementioned embodiment, the deflector apparatus 1 further includes the slide rail 24 mounted to the movable portion 11 at the rear of the vehicle. The movable portion 11 is configured to be slidable either obliquely forward and upward or obliquely backward and downward.

According to the aforementioned embodiment, the driving system 20 controls a sliding amount of the movable portion 11.

According to the aforementioned embodiment, the front end portion and the rear end portion of the movable portion 11 are positioned at the same height.

According to the aforementioned embodiment, the driving system 20 controls the protrusion amount to decrease in a stepwise manner in a case where the vehicle speed increases and the protrusion amount to increase in a stepwise manner in a case where the vehicle speed decreases using separate tables.

According to the aforementioned embodiment, the CPU 23a determines the weather condition by detecting an on/off state of the switch of the wiper.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A deflector apparatus for regulating air flows at a rear of a vehicle, comprising:
    a movable portion arranged at a rear of a roof panel and an upper of a rear window of a vehicle and extended in a vehicle width direction, the movable portion movable to increase and decrease a protrusion amount of a front end portion of the movable portion in a vehicle front-rear direction from an upper surface of the roof panel to upward; and
    a driving system for driving the movable portion to decrease the protrusion amount as a vehicle speed increases to decrease an amount of air introduced by the movable portion and flowing along the rear window, the driving system for driving the movable portion to increase the protrusion amount as the vehicle speed decreases to increase the amount of air introduced by the movable portion and flowing along the rear window;
    wherein at the same vehicle speed, the movable portion is set so that the protrusion amount during deceleration of the vehicle is less that the protrusion amount during acceleration of the vehicle.

2. The deflector apparatus according to claim 1, wherein a rear end portion of the movable portion in the vehicle front-rear direction is positioned lower than the front end portion of the movable portion in the vehicle front-rear direction while the front end portion of the movable portion in the vehicle front-rear direction protrudes higher than the upper surface of the roof panel.

3. The deflector apparatus according to claim 2, further comprising;
    a fixed portion arranged at opposing ends of the movable portion in the vehicle width direction and extended in the vehicle width direction, the fixed portion fixed at a rear end portion of the roof panel in the vehicle front-rear direction, wherein the movable portion is arranged at a center in the vehicle width direction.

4. The deflector apparatus according to claim 1, wherein the driving system decreases the protrusion amount of the movable portion in a stepwise manner as the vehicle speed increases and increases the protrusion amount of the movable portion in a stepwise manner as the vehicle speed decreases.

5. The deflector apparatus according to claim 1, wherein the driving system includes a weather determination device determining a weather condition and drives the movable portion to position an upper surface of the movable portion and the upper surface of the roof panel in a planar manner regardless of a magnitude of the vehicle speed when the weather determination device determines weather lacking rain.

6. The deflector apparatus according to claim 1, wherein the front end portion of the movable portion in the vehicle front-rear direction is in contact with a rear end portion of the roof panel in the vehicle front-rear direction while an upper surface of the movable portion and the upper surface of the roof panel are positioned in a planar manner.

7. The deflector apparatus according to claim 1, further comprising:
    a shaft mounted to a rear end portion of the movable portion at the rear of the vehicle, wherein the movable portion is configured to pivot about the shaft.

8. The deflector apparatus according to claim 7, wherein the driving system controls a pivot angle of the movable portion.

9. The deflector apparatus according to claim 1, further comprising:
    a slide rail mounted to the movable portion at the rear of the vehicle, wherein the movable portion is configured to be slidable either obliquely forward and upward or obliquely backward and downward.

10. The deflector apparatus according to claim 1, wherein the driving system controls a sliding amount of the movable portion.

11. The deflector apparatus according to claim 10, wherein the front end portion and a rear end portion of the movable portion are positioned at a same height.

12. The deflector apparatus according to claim 4, wherein the driving system controls the protrusion amount to decrease in a stepwise manner in a case where the vehicle speed increases and the protrusion amount to increase in a stepwise manner in a case where the vehicle speed decreases using separate tables.

13. The deflector apparatus according to claim 5, wherein the weather determination device determines the weather condition by detecting an on/off state of a switch of a wiper.

* * * * *